US012217727B1

(12) United States Patent
Mendel

(10) Patent No.: US 12,217,727 B1
(45) Date of Patent: Feb. 4, 2025

(54) LOCKABLE POTENTIOMETER APPARATUS AND METHODS OF USE THEREOF

(71) Applicant: Adam Samuel Mendel, Bend, OR (US)

(72) Inventor: Adam Samuel Mendel, Bend, OR (US)

(73) Assignee: Switchlock, LLC, Hendersonville, TN (US)

( * ) Notice: Subject to any disclaimer, the term of this patent is extended or adjusted under 35 U.S.C. 154(b) by 445 days.

(21) Appl. No.: 17/562,996

(22) Filed: Dec. 27, 2021

Related U.S. Application Data

(60) Provisional application No. 63/130,823, filed on Dec. 27, 2020.

(51) Int. Cl.
*G10D 1/08* (2006.01)

(52) U.S. Cl.
CPC .................................... *G10D 1/08* (2013.01)

(58) Field of Classification Search
CPC .................................. G10D 1/00; G10D 1/08
See application file for complete search history.

(56) References Cited

U.S. PATENT DOCUMENTS

2017/0060169 A1* 3/2017 Stroh ....................... G10H 3/18

* cited by examiner

*Primary Examiner* — Kimberly R Lockett
(74) *Attorney, Agent, or Firm* — Patterson Intellectual Property Law, P.C.; Mark A. Kilgore

(57) ABSTRACT

A volume lock apparatus for a guitar having a volume knob connected to a potentiometer shaft may include a toothed washer, an inner body, an outer body, and a set screw configuration to translate rotational movement from the outer body to the inner body and further configured to set an upper movement limit for the outer body. The Volume lock is an accessory that the user can easily install in place of the stock knob on a guitar's volume or tone potentiometer. It allows the user to stop the rotation of the guitars potentiometer by pressing the knob downward which engages the hirth joint in the outer body with the hirth joint in the toothed washer.

16 Claims, 10 Drawing Sheets

LOCKABLE POTENTIOMETER APPARATUS AND METHODS OF USE THEREOF

BACKGROUND

1. Field of the Invention

The present invention relates generally to guitar knobs and/or dials which can be locked.

More particularly, this invention pertains to selectively locking a position of a guitar's knob and/or dial.

2. Description of the Prior Art

Many electric guitars have a knob and/or a dial positioned on the body of the guitar. There are three main styles of such knobs, namely, "bell" knobs, "speed" knobs, and "domed" knobs, each of which is shown in FIGS. 1A, 1B, and 1C, respectively. The knobs and/or dials can be used to adjust the gain, volume, tone, or other similar features of the guitar and the sound it produces. Many guitars may contain more than one knob and/or dial so that a variety of features can be easily controlled and adjusted by the musician playing the instrument.

First, as shown in FIG. 1A, is a bell knob 10. These can also be referred to as hat, bell hat, UFO or hut knobs. They are typically found on LP and strat guitars. On Les Paul® guitars, they are typically clear knobs with the color and numbers painted underneath. The most common colors are gold and black. Amber knobs use translucent amber plastic and are painted gold on the bottom. Strat bell knobs are solid colors with the numbers and volume/tone embossed on the outside.

Second, as shown in FIG. 1B, is a speed knob 20. Speed knobs, also called barrel knobs, get their name from their beefy, large diameter shape that allows for easy and quick adjustment of the controls. The diameter is about the same as the bottom skirt of a bell knob except they do not taper inwards. Typically, construction is clear plastic with the color and numbers painted underneath. When looking at the amber version of these knobs, it can appear darker than the bell version because the plastic is thicker, which makes the numbers harder to read.

Third, as shown in FIG. 1C, is a domed knob 30. These are not always domed and sometimes have flat tops. They are can be constructed of metal, plastic, or wood. The sides usually have a knurled texture that can range from fine to coarse. This appears on a lot of Telecaster guitars but has become very popular on super strats (ie. Ibanez®, Charvel®, Jackson®, etc.). A domed knob will give the guitar a sleek appearance The issue with a guitar's knob or dial is that because it is positioned on the body of the guitar, on the same side of the guitar as the strings, and near the strings, it can be accidentally engaged by the musician causing a change to the knob or dial setting while playing the guitar. Accordingly, a need exists for a solution that enables the knob and/or dial to be locked in a set position so that inadvertent engagement cannot occur, but while also allowing for the knob or dial to be easily unlocked for volume or knob adjustment as needed by the musician.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure provides a solution to the issues surrounding accidental actuation of a guitar's knob or dial while playing the guitar. The present disclosure provides a lockable potentiometer apparatus which replaces the standard knob or dial of existing guitars in order to provide for a locked position and an unlocked position for knob adjustment, such as adjusting the volume, gain, tone, or the like. The disclosed lockable apparatus may comprise four main parts, namely, a toothed washer, an inner body, an outer body, and a grub screw.

The potentiometer lock is an accessory that the user can easily install in place of the stock knob on a guitar's volume or tone potentiometer. It allows the user to stop the rotation of the guitars potentiometer by pressing the knob downward which engages a hirth joint in the outer body with a hirth joint in the toothed washer.

A detent system is created by cantilever springs in the inner body and detents defined along an inner surface of the outer body. The detent system creates a bistable mechanism which allows the outer body to rest in either the locked or unlocked position at the user's preference.

A grub screw may serve three functions: (1) to secure the potentiometer lock to the potentiometer shaft, (2) to set the upward movement limit of the outer body, and (3) to translate rotational movement from the outer body to the inner body.

Numerous other objects, advantages, and features of the present disclosure will be readily apparent to those of skill in the art upon a review of the following Drawings and Detailed Description.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words “connected”, “attached”, “joined”, “mounted”, “fastened”, and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

It will be understood by one of skill in the art that the present invention or set of inventions is drawn to a lockable potentiometer. Many embodiments of the lockable potentiometer may be described as set forth herein. In some embodiments, the lockable potentiometer may be a knob, a dial, a lever, a switch, a trigger, or the like. Additionally, while the embodiments of the present invention(s) may include a guitar or other similar musical instrument, other embodiments and uses are contemplated herein. In some examples, the lockable potentiometer may be referred to as a volume lock, a tone lock, a lockable dial, a lockable knob, a lockable apparatus, and the like, and it will be understood that each of the foregoing may be understood to be a lockable potentiometer and not limiting as to its features or its controls.

Figure 1A:
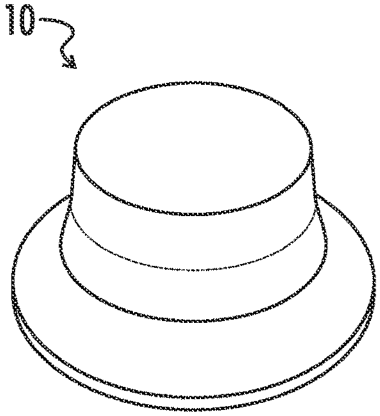
FIG. 1A (PRIOR ART)
FIG. 1A is a perspective view of bell knob.
Figure 1B:
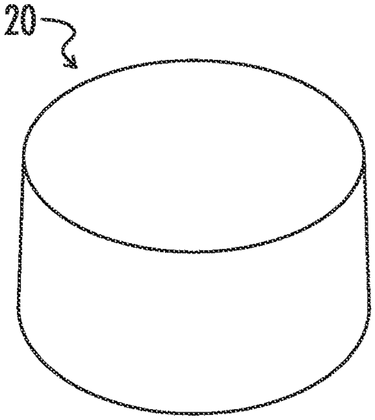
FIG. 1B (PRIOR ART)
FIG. 1B is a perspective view of speed knob.
Figure 1C:
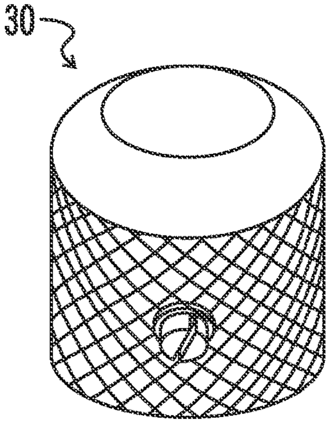
FIG. 1C (PRIOR ART)
FIG. 1C is a perspective view of domed knob.
Figure 2:
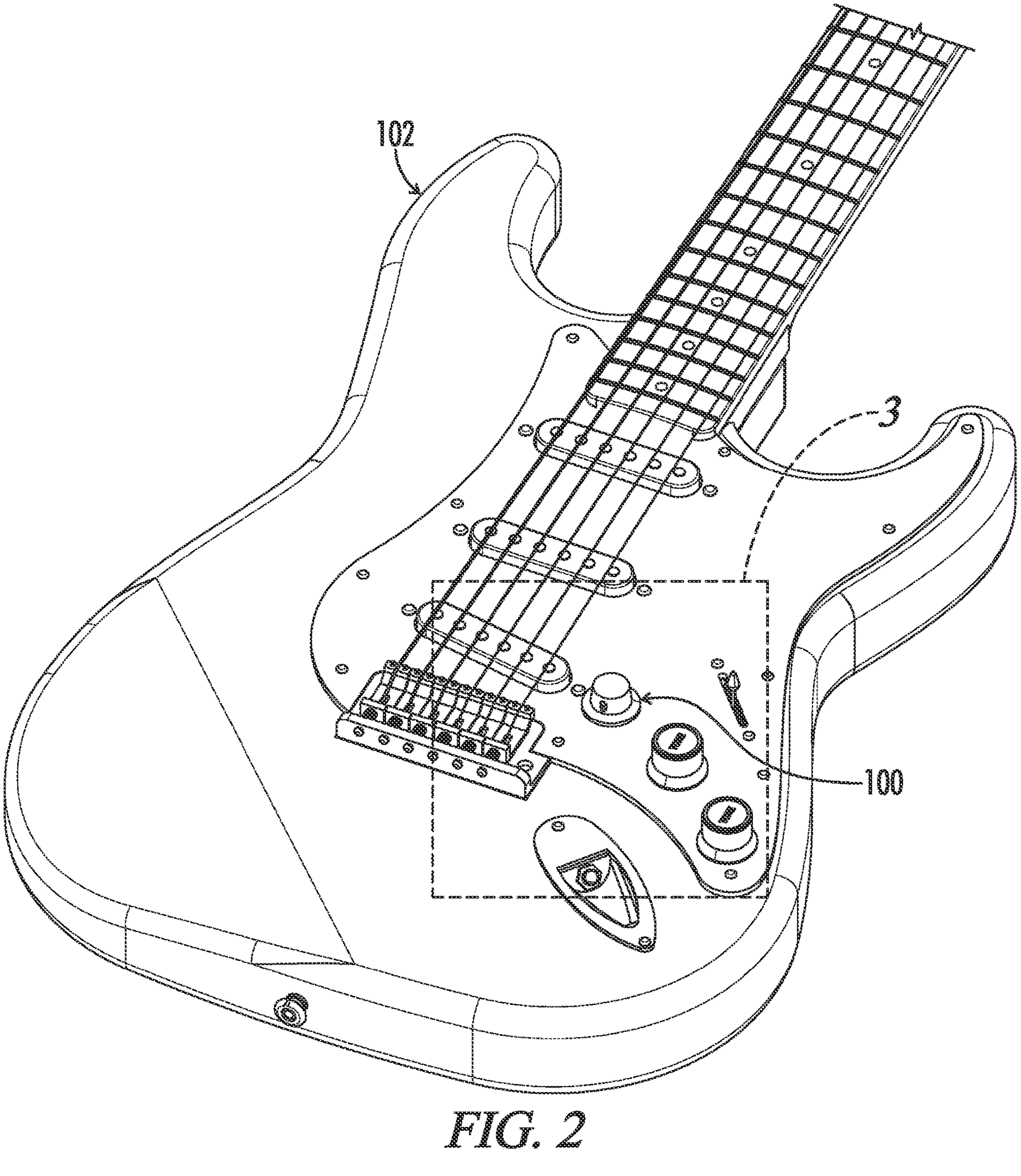
FIG. 2 is a perspective view of an embodiment of the lockable apparatus featuring a bell knob style installed on a guitar in accordance with the present disclosure.
Figure 3:
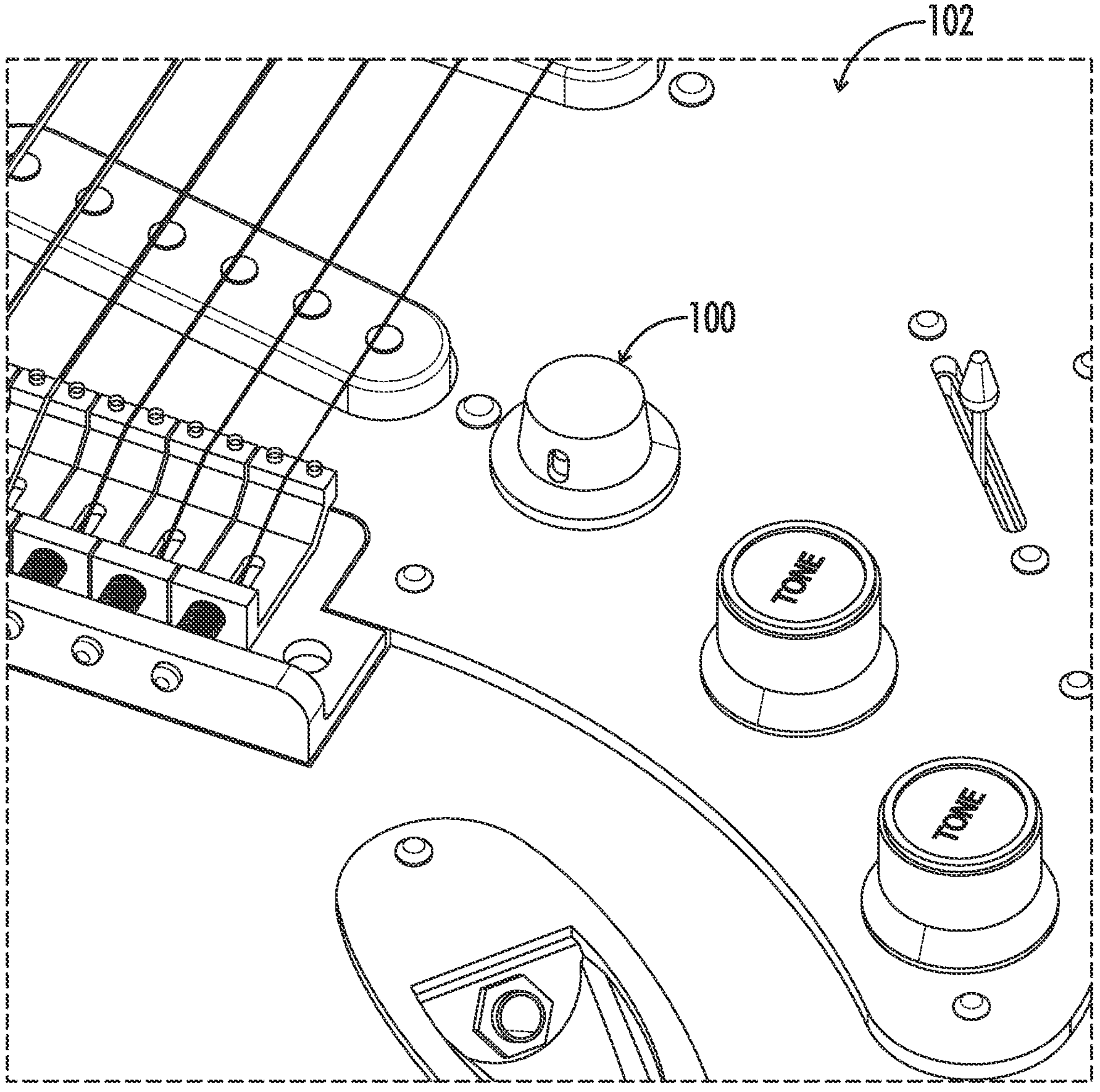
FIG. 3 is an enlarged perspective view of the embodiment of the lockable apparatus of FIG. 2 installed on a guitar in accordance with the present disclosure.
Figure 4A:
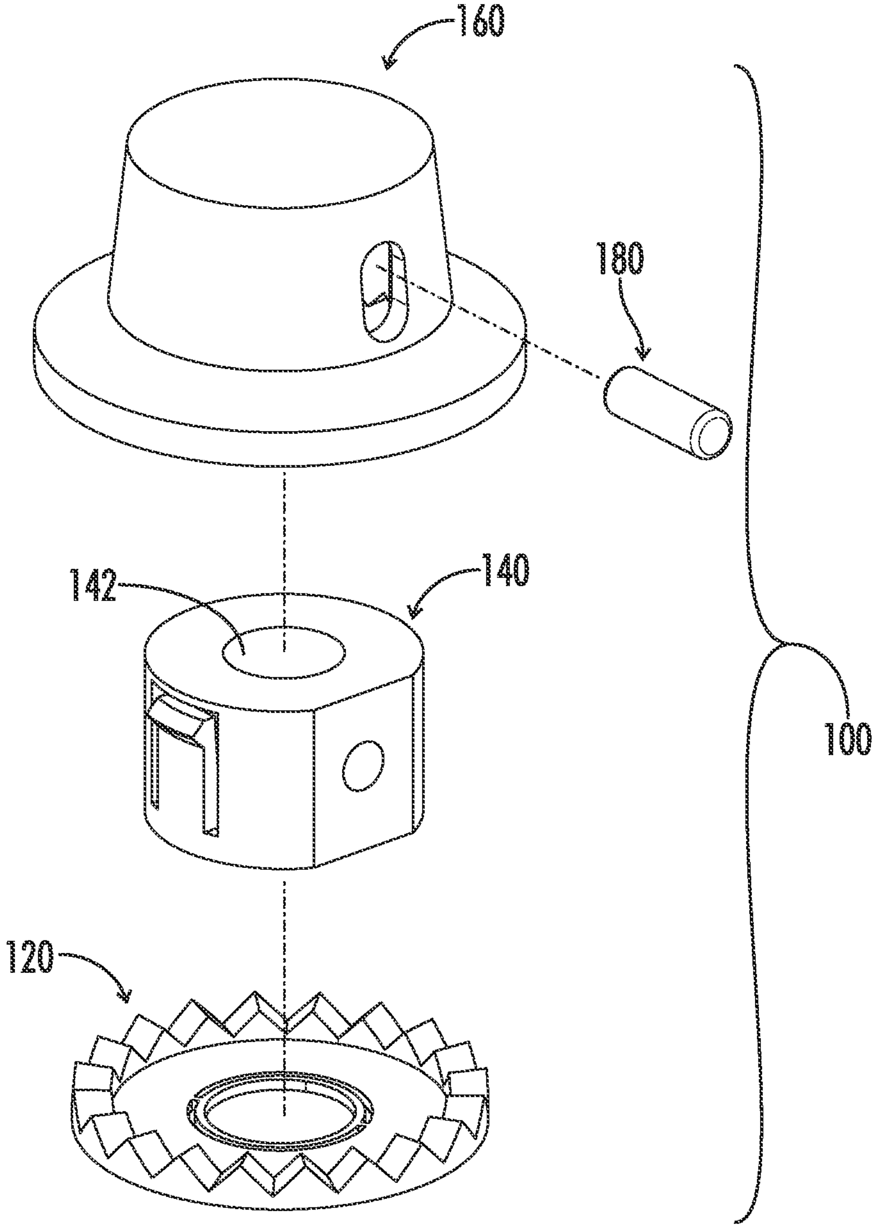
FIG. 4A is an exploded perspective view of an embodiment of a lockable potentiometer apparatus in accordance with the present disclosure.
Figure 4B:
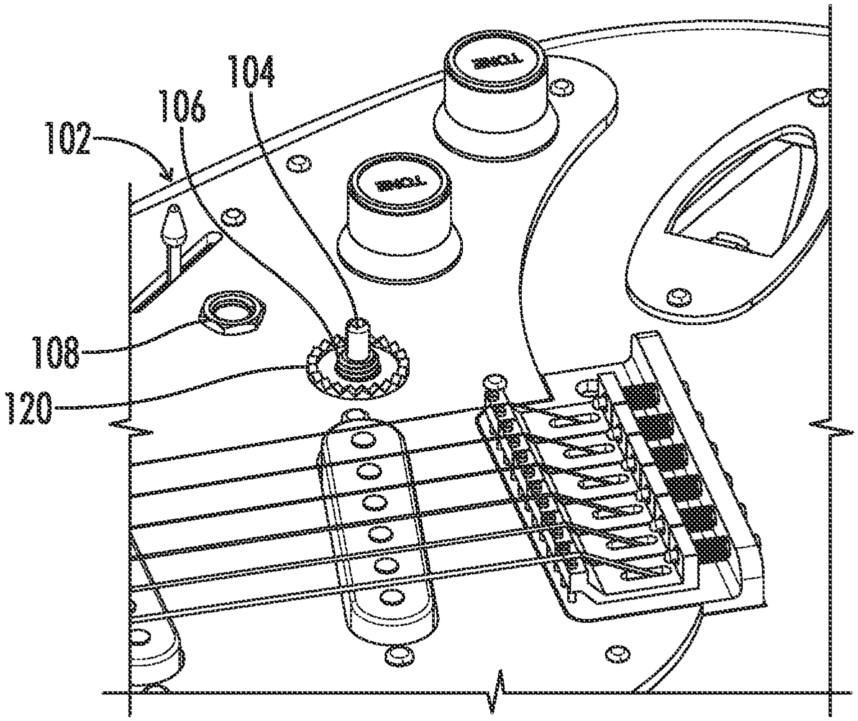
FIG. 4B is a perspective view of a toothed washer installed on the body of a guitar.

Referring to FIGS. 2 and 3, a potentiometer locking apparatus 100 is shown installed on the body of a guitar 102 surrounding a potentiometer shaft 104 (FIGS. 4B and 4C) which may be used to replace a standard volume knob (not shown) of the guitar 102. The potentiometer locking apparatus 100 may be configured to lock a position of the potentiometer shaft 104 for controlling a volume, tone, gain, or the like of the guitar 102. The potentiometer locking apparatus 100 may be positioned in a locked configuration 110 by pushing the knob inward towards the guitar 102 such that the potentiometer locking apparatus 100 may no longer spin to control the position of the potentiometer shaft 104. The potentiometer locking apparatus 100 can also be positioned in an unlocked configuration 112 by pulling the knob outward away from the guitar 102 such that the potentiometer locking apparatus 100 may spin to control the position of the potentiometer shaft 104.

In certain embodiments of the present invention, a volume lock apparatus is described. The volume lock apparatus 100 is shown in greater detail in FIGS. 4A-13. The volume lock apparatus 100 may comprise a toothed washer 120, an inner body 140, an outer body 160, and a set screw 180. The set screw 180 may also be referred to herein as a grub screw 180.

Figure 4C:
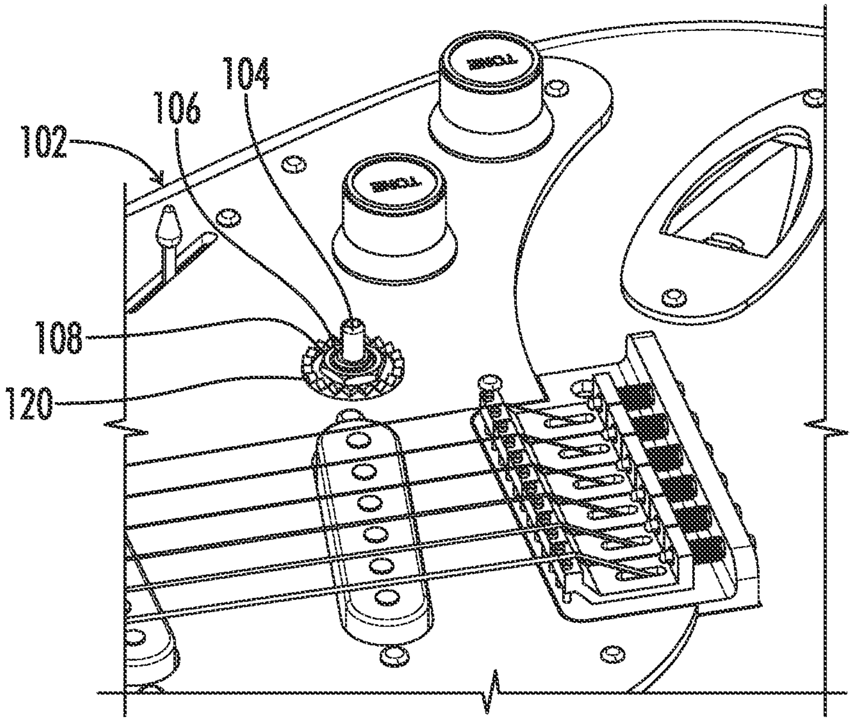
FIG. 4C is a perspective view of a toothed washer retained by a nut to the body of a guitar.
Figure 5:
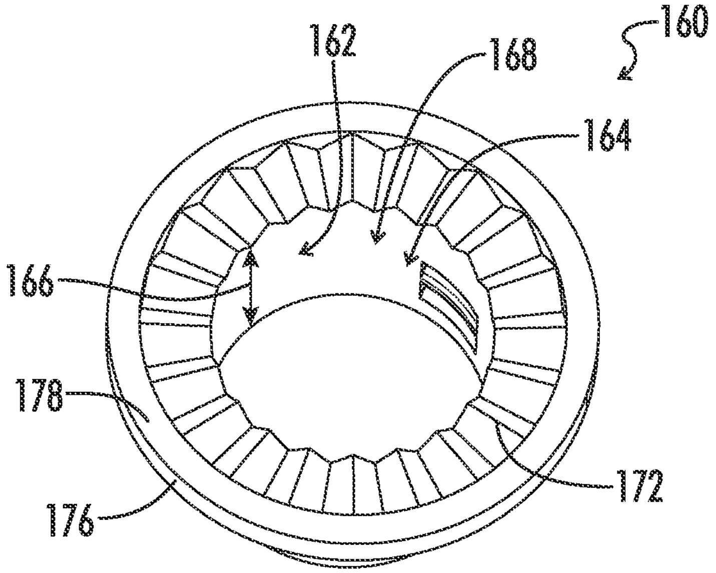
FIG. 5 is a lower perspective view of an outer body of the lockable apparatus of FIG. 4A in accordance with the present disclosure.
Figure 6:
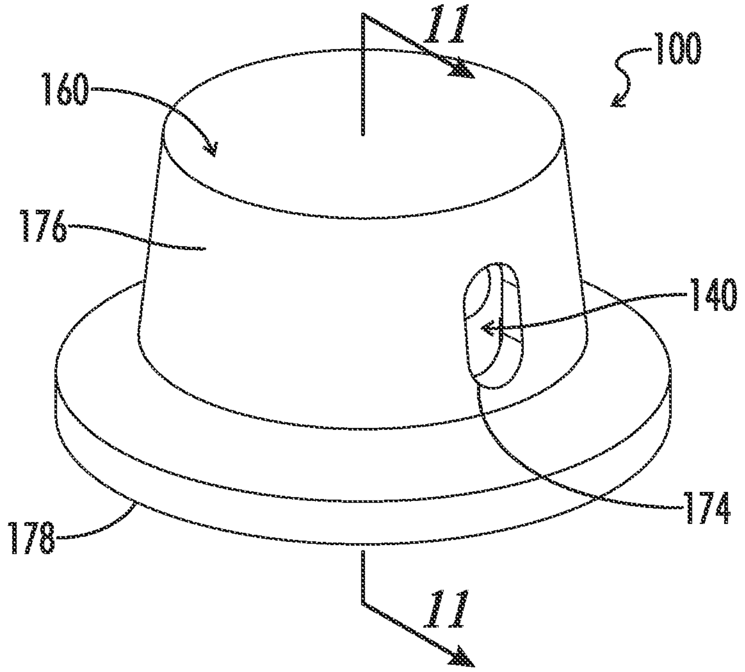
FIG. 6 a perspective view of the lockable apparatus of FIG. 2 in accordance with the present disclosure.
Figure 7:
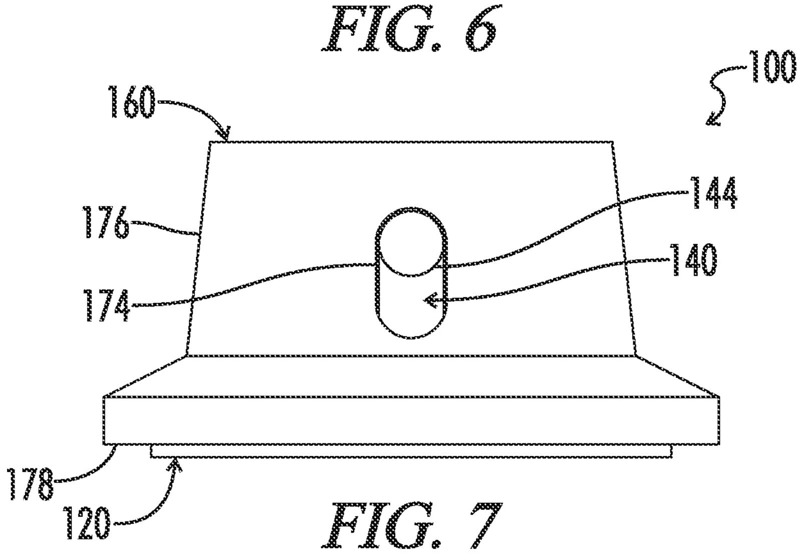
FIG. 7 is a front elevation view of the lockable apparatus of FIG. 6 in accordance with the present disclosure.
Figure 8:
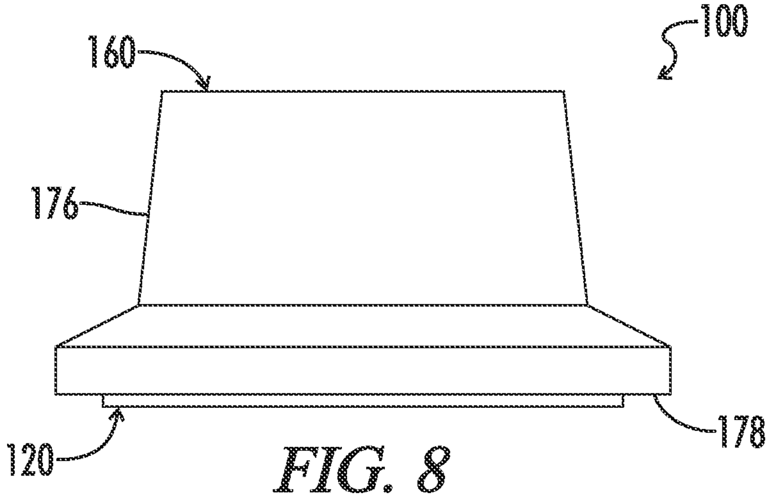
FIG. 8 is a rear elevation view of the lockable apparatus of FIG. 6 in accordance with the present disclosure.
Figure 9:
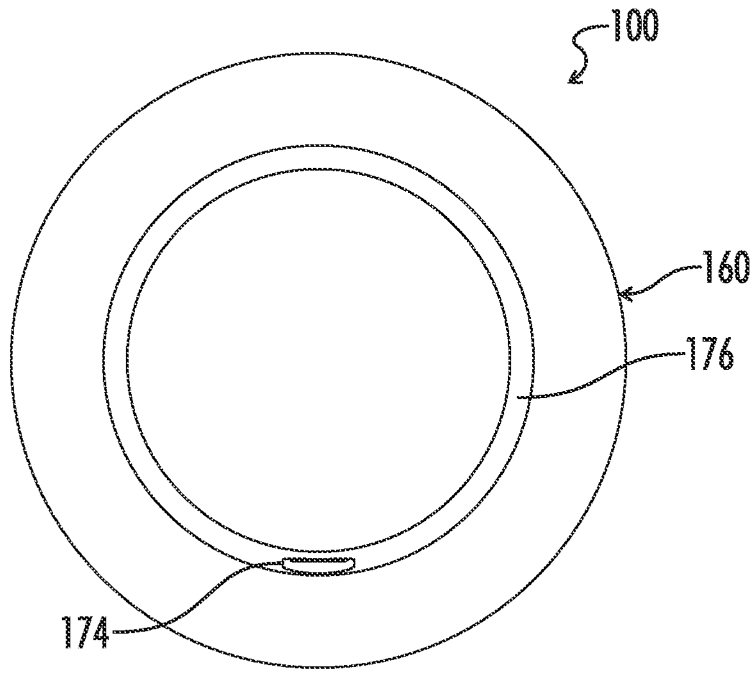
FIG. 9 is a top plan view of the lockable apparatus of FIG. 6 in accordance with the present disclosure.
Figure 10:
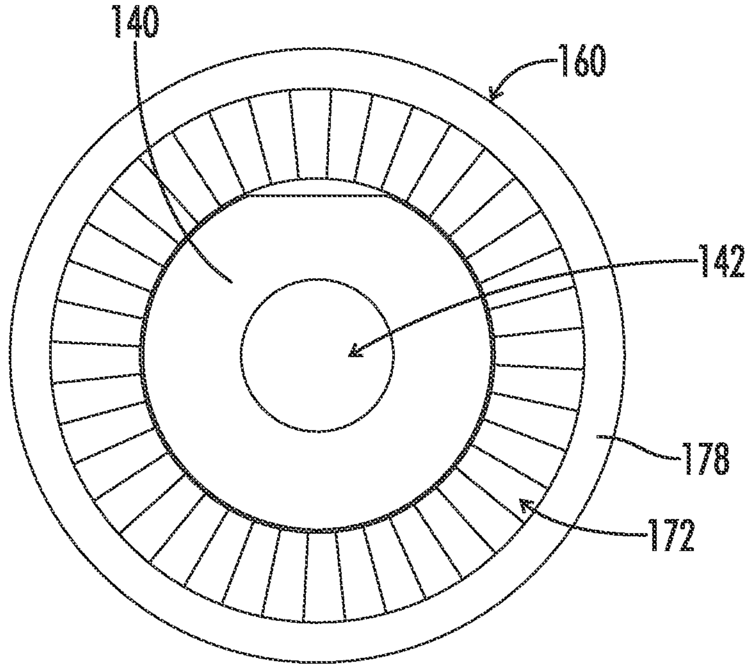
FIG. 10 is a bottom plan view of the outer body and an inner body of the lockable apparatus of FIG. 6 in accordance with the present disclosure.

As illustrated in FIGS. 4A, 4C, 12, and 13, the toothed washer 120 may be configured to surround male threads 106 (FIGS. 4B and 4C) surrounding a portion of the potentiometer shaft 104. The male threads 106 extend from the body of the guitar 102. The toothed washer 120 may include a washer opening 122, a toothed washer portion 124, and an upper surface 126. The male threads 106 may be configured to be positioned through the washer opening 122. The toothed washer portion 124 is configured to circumferentially surround the washer opening 122 and be positioned above the upper surface 126. The upper surface 126 is defined between the washer opening 122 and the toothed washer potion 124. As illustrated in FIG. 4C, a nut 108 of the guitar 102 may engage the male threads 106 to sandwich the toothed washer 120 between the guitar 102 and the nut 108 and prevent the toothed washer 120 from moving. The nut 108 may engage the upper surface 126 of the toothed washer 120.

Figure 13:
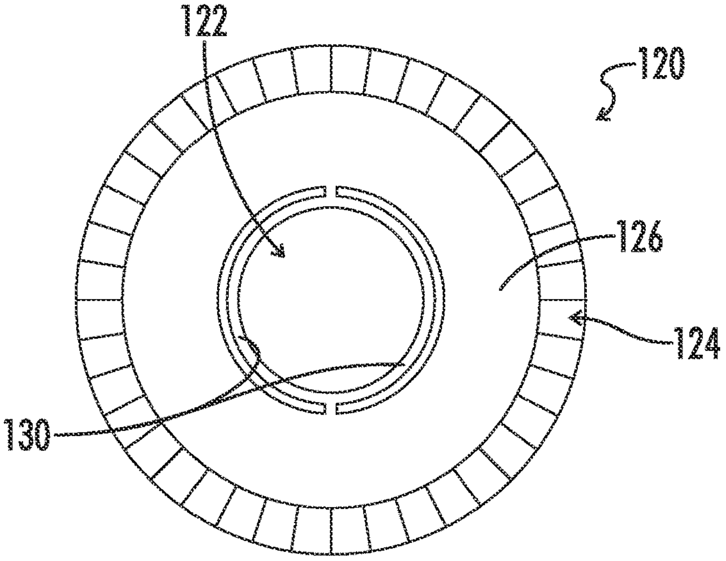
FIG. 13 is a top plan view of the toothed washer of FIG. 6 in accordance with the present disclosure.

As illustrated in FIG. 13, the toothed washer 120 may further include a removable tab portion 130 positioned within the washer opening 122. The removable tab portion 130 may be removed to allow for different sized male threads 106 to be positioned through the washer opening 122. For example, with the removable tab portion 130 in place, the washer opening 122 is configured to receive smaller potentiometer shafts (e.g., typically associated with metric system male threads 106) common on certain guitar models. Further for example, with the removable tab portion 130 removed, the washer opening 122 is configured to receive larger potentiometer shafts (e.g., typically associated with US system male threads 106) common on certain other guitar models.

In other embodiments, as discussed below, the washer opening may be threaded in order to engage the male threads 106 surrounding of the volume potentiometer shaft 104. This embodiment, however, requires the purchaser to know whether they have metric system or US system male threads 106 surrounding the potentiometer shaft 104 of their guitar.

Figure 12:
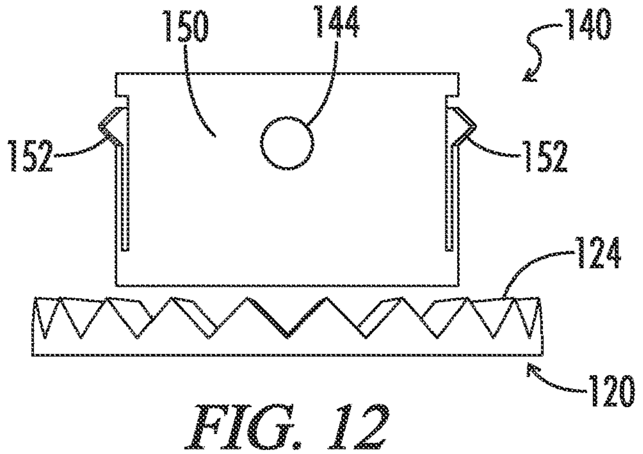
FIG. 12 is a front elevation view of a toothed washer and inner body of the lockable apparatus of FIG. 6 in accordance with the present disclosure.

The inner body 140 may be configured to surround a portion of the potentiometer shaft 104 above the male threads 106. The inner body 140 may be further be configured to rest upon one of the upper surface 126 of the toothed washer 120 or the nut 108 of the guitar 102. The inner body 140 may include a central bore 142 extending vertically through the inner body 140 perpendicular to the toothed washer 120. The inner body 140 may further include a tapped hole 144 configured to receive the set screw 180. The set screw 180 may extend into the central bore 142 for engaging the potentiometer shaft 104. The inner body 140 may further include a cylindrically shaped outer surface 150 and at least one cantilever spring 152 integrally formed into the outer surface 150. As illustrated in FIG. 12, the at least one cantilever spring 152 includes two cantilever springs positioned on opposite sides of the inner body 140, each of which is offset from the tapped hole 144 by ninety (90) degrees.

The outer body 160 may include a receptable 162 defined therein. The receptable 162 may include a lower opening 164 and a receptacle depth 166 extending from the lower opening 164. The receptacle 162 may be configured to receive the inner body 140 and surround the portion of the potentiometer shaft 104 above the male threads 106. The receptacle 162 may further include a cylindrically shaped inner surface 168 having at least one pair of aligned detents 170. The at least one pair of aligned detents 170 may be defined in the inner surface 168 and spaced apart along the receptable depth 166.

Figure 11:
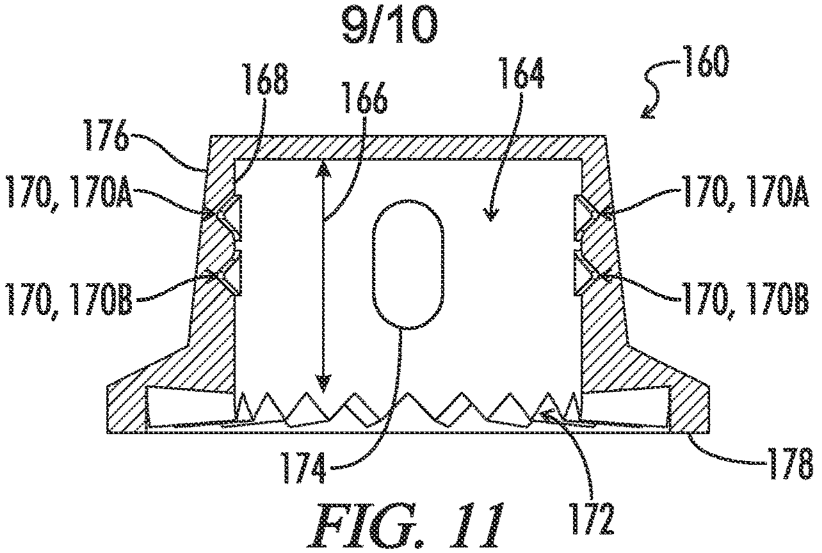
FIG. 11 is a cross-sectional front elevation view of the outer body of the lockable apparatus of FIG. 6 taken along line 11-11 of FIG. 6 in accordance with the present disclosure.

The at least one pair of aligned detents 170 may be configured to selectively receive the at least one cantilever spring 152 of the inner body 140, as shown in FIG. 11. For example, an upper detent 170A of the at least one pair of aligned detents 170 may be engaged by the at least one cantilever spring 152 in order to position the outer body in the locked position 110. Further, for example, a lower detent 170B of the at least one pair of aligned detents 170 may be engaged by the at least one cantilever spring 152 in order to position the outer body in the unlocked position 112.

The outer body 160 may include a toothed outer body portion 172 circumferentially surrounding the lower opening 164 of the receptable 162. The toothed outer body portion 172 may be configured to selectively engage the toothed washer portion 124 of the toothed washer 120 to define a hirth joint. Accordingly, each of the toothed outer body portion 172 and the toothed washer portion 124 may define a portion of a hirth joint.

The outer body 160 may further include a slot 174 defined between the inner surface 168 of the receptacle 162 and an outer surface 176 of the outer body 160. The slot 174 may be configured to align with the tapped hole 144 of the inner body 140. The slot 174 may be vertically oriented parallel to the receptacle depth 166. The slot 174 may further be configured to receive a portion of the set screw 180 for limiting movement of the outer body 160 relative to the inner body 140 in a vertical direction parallel to the receptacle depth 166.

The outer body 160 may further include a skirt 178 extending below the toothed upper body potion 172. The toothed upper body potion 172 may be positioned between the lower opening 164 of the receptacle 162 and the skirt 178. The skirt 178 may be configured to hide the toothed washer 120 when the volume lock apparatus 100 is installed on the guitar 102.

During use of the volume lock apparatus 100, the toothed washer 120 is configured to lock the outer body 160 to the guitar 102 via engagement between the toothed washer portion 124 and the toothed upper body potion 172 (e.g., in the locked configuration 110). The at least one cantilever spring 152 is molded into the inner body 140 to create a bistable detent system when paired with the at least one pair of aligned detents 170 of the outer body 160, thereby allowing the outer body 160 to rest in either the locked configuration 110 or the unlocked configuration 112.

During use of the volume lock apparatus 100, the tapped hole 144 of the set screw 180 serves three functions, namely, (1) to secure the volume lock apparatus 100 to the potentiometer shaft 104, (2) to limit the upper motion of the outer body 160 (e.g., via the set screw 180 being partially received in the slot 174), and (3) to translate rotational movement from the outer body 160 to the inner body 140 and the potentiometer shaft 104.

In certain optional embodiments, the size, quantity and shape of both the at least one cantilever spring 152 and the at least one pair of aligned detents 170 may change without diverting from this disclosure and while maintaining the functionality of the volume lock apparatus 100.

The outer surface 176 of the outer body 160 of the volume lock apparatus 100 is shaped like to the bell knob 10. In other embodiments, the outer surface 176 of the outer body 160 of the volume lock apparatus 100 may be shaped like a speed knob 20 while maintaining the configuration and functionality of substantially all other elements of the volume lock apparatus 100.

Figure 14:
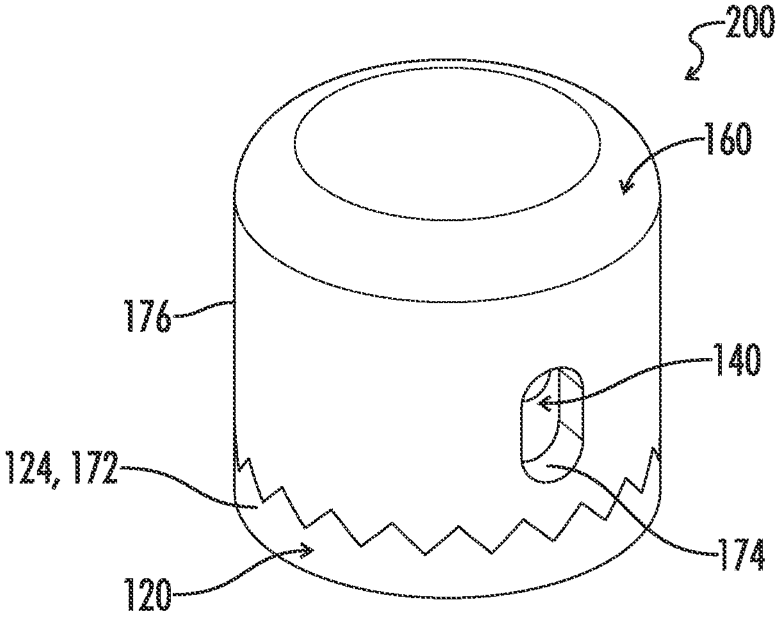
FIG. 14 is a perspective view of an embodiment of a lockable potentiometer apparatus featuring a domed knob style in accordance with the present disclosure.
Figure 15:
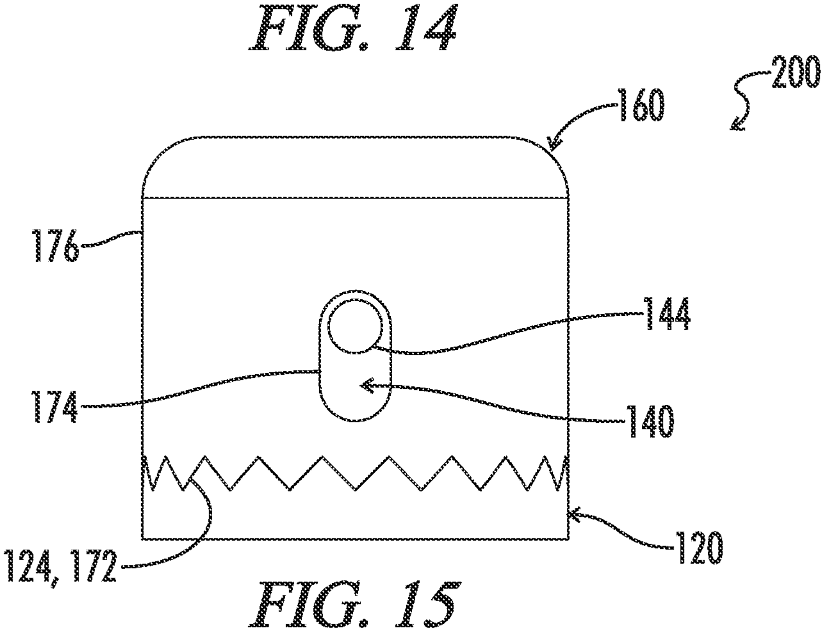
FIG. 15 is a front elevation view of the lockable apparatus of FIG. 14 in accordance with the present disclosure.
Figure 16:
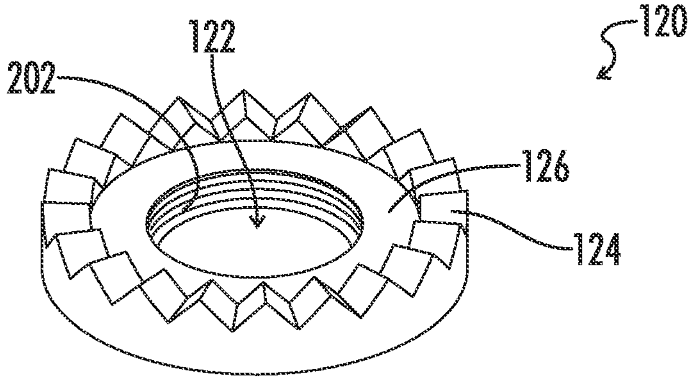
FIG. 16 is a perspective view of a toothed washer of the lockable apparatus of FIG. 14 in accordance with the present disclosure.

Referring to FIGS. 14-16, another embodiment of a volume lock apparatus 200 is shown. Similar elements of the volume lock apparatus 200 are number similarly and function similarly to those of the volume lock apparatus 100. The outer surface 176 of the outer body 160 of the volume lock apparatus 200 is shaped like to the domed knob 30. Optional differences between the volume lock apparatus 200 and the volume lock apparatus 100 will now be discussed.

First, the hirth joint formed between the toothed washer potion 124 of the toothed washer 120 and the toothed upper body portion 172 of the upper body 160 is not hidden under the skirt of the upper body 160.

Second, the internal surface of the toothed washer 120 includes female threads 202 cut therein and configured to mate with the male threads 106 of the potentiometer shaft 104. Accordingly, the nut 108 is integral with the toothed washer 120. This configuration is also applicable with the volume lock apparatus 100.

To facilitate the understanding of the embodiments described herein, a number of terms have been defined above. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful apparatus and method for automatic tire ply splicing, it is not intended that such references be construed as limitations upon the scope of this disclosure except as set forth in the following claims.

What is claimed is:

1. A volume lock apparatus for a guitar having a volume potentiometer shaft with male threads surrounding a portion of the volume potentiometer shaft, the volume lock apparatus comprising:

a toothed washer configured to surround the male threads of the volume potentiometer shaft, the toothed washer including a washer opening, a toothed washer portion circumferentially surrounding the washer opening, and an upper surface defined between the washer opening and the tooth washer portion;

an inner body configured to surround a portion of the volume potentiometer shaft above the male threads and rest upon the upper surface of the toothed washer, the inner body including a tapped hole configured to receive a set screw, the set screw configured to engage the volume potentiometer shaft, the inner body further including an outer cylindrical surface and at least one cantilever spring integrally formed into the outer cylindrical surface; and an outer body including a receptacle defined therein having a lower opening and a receptacle depth extending from the lower opening, the receptacle configured to receive the inner body and surround a portion of the volume potentiometer shaft above the male threads, the receptacle including an inner cylindrical surface having at least one pair of aligned detent defined therein and spaced apart along the receptacle depth, the at least one pair of aligned detents configured to selectively receive the at least one cantilever spring of the inner body, the outer body including a toothed outer body portion surrounding the lower opening of the receptacle, the toothed outer body portion configured to selectively engage the toothed washer portion of the toothed washer, the outer body further including a slot defined between the inner cylindrical surface and an outer surface of the outer body, the slot configured to align with the tapped hole of the inner body for access to the set screw.

2. A potentiometer lock apparatus for a guitar having a potentiometer shaft with male threads surrounding a portion of the potentiometer shaft, the potentiometer lock apparatus comprising:

a toothed washer configured to surround the male threads of the potentiometer shaft;

an inner body configured rest upon the toothed washer, the inner body further configured to surround and be coupled to a portion of the potentiometer shaft above the male threads; and an outer body configured to surround the inner body and be positioned in one of a locked configuration or an unlock configuration, the outer body configured to engage the toothed washer when in the locked configuration and be separated from the toothed washer when in the unlocked configuration, the outer body in combination with the inner body configured to adjust a position of the potentiometer shaft when the outer body is positioned in the unlocked configuration.

3. The potentiometer lock apparatus of claim 2, wherein:

the toothed washer includes a washer opening and a toothed washer portion circumferentially surrounding the washer opening; and the outer body includes a toothed outer body portion configured to engage the toothed washer portion when the outer body is positioned in the locked configuration for preventing rotation of the outer body portion.

4. The potentiometer lock apparatus of claim 3, wherein:

the toothed outer body portion surrounds a lower opening of the outer body; and the toothed washer includes an upper surface defined between the washer opening and the tooth washer portion.

5. The potentiometer lock apparatus of claim 3, wherein:

the toothed washer portion in combination with the toothed outer body portion defines a Hirth joint.

6. The potentiometer lock apparatus of claim 2, wherein:

the inner body includes a tapped hole configured to receive a set screw; and the set screw is configured to engage the potentiometer shaft such that the inner body and the potentiometer shaft are configured to rotate in unison.

7. The potentiometer lock apparatus of claim 6, wherein:

the outer body includes a receptacle configured to receive the inner body and a slot defined between an inner surface of the receptacle and an outer surface of the outer body, the slot configured to align with the tapped hole of the inner body for access to the set screw.

8. The potentiometer lock apparatus of claim 7, wherein:

the set screw is configured to extend at least partially into the slot of the outer body for limiting movement of the outer body between the locked configuration and the unlocked configuration.

9. The potentiometer lock apparatus of claim 2, wherein:

the inner body includes an outer surface and at least one cantilever spring integrally formed into the outer surface; and the outer body includes a receptacle having an inner surface, and at least one pair of aligned detents defined in the inner surface configured to selectively receive the at least one cantilever spring of the inner body.

10. The potentiometer lock apparatus of claim 9, wherein:

each detent of the at least one pair of aligned detents is associated with a different one of the locked configuration or the unlocked configuration.

11. The potentiometer lock apparatus of claim 9, wherein:

the receptacle of the outer body includes a receptacle depth extending from a lower opening of the receptacle; and the at least one pair of aligned detents are spaced apart along the receptacle depth.

12. The potentiometer lock apparatus of claim 8, wherein:

the outer surface of the inner body and the inner surface of the receptacle of the outer body are cylindrical.

13. The potentiometer lock apparatus of claim 2, wherein:

the toothed washer includes a washer opening, a toothed washer portion circumferentially surrounding the washer opening, and an upper surface defined between the washer opening and the tooth washer portion.

14. The potentiometer lock apparatus of claim 13, wherein:

the toothed washer may further include a removable tab portion positioned within the washer opening, the removable tab portion configured to be optionally removed for accommodating different sized male threads of the guitar.

15. The potentiometer lock apparatus of claim 13, wherein:

the washer opening includes female threads configured to engage the male threads surrounding the portion of the potentiometer shaft of the guitar.

16. The potentiometer lock apparatus of claim 2, further comprising:

a nut configured to engage the male threads surrounding the portion of the potentiometer shaft of the guitar for clamping the toothed washer to guitar.

* * * * *